United States Patent Office 3,469,955
Patented Sept. 30, 1969

3,469,955
CORROSION-INHIBITED HYDROCARBON
COMPOSITIONS
Hellmuth Grosse-Oetringhaus, Hamburg-Harburg,
Germany, assignor to Shell Oil Company, New
York, N.Y., a corporation of Delaware
No Drawing. Filed June 2, 1966, Ser. No. 554,694
Claims priority, application Germany, June 8, 1965,
S 97,518
Int. Cl. C10l 1/22
U.S. Cl. 44—63
4 Claims

ABSTRACT OF THE DISCLOSURE

A hydrocarbon composition containing an anticorrosive amount of N-acyl-amino acid and morpholine.

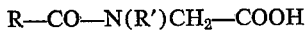

This invention relates to liquid hydrocarbons containing corrosion-inhibiting amounts of acyl-amino acetic acids and morpholine.

Storage tanks and pipe lines for liquid hydrocarbon fuels are often exposed to rust formation resulting from water contamination of the system. The presence of rust and metal ions in the fuel stream may lead to disturbances in control equipment, gasifiers, spray nozzles, or burner nozzles and may cause undesirable emulsification and sludge-forming tendencies. The danger of corrosion is especially prominent in storage tanks of medium or small-sized heating installation which are not subject to regular maintenance and which may be out of operation for fairly long periods of time.

While a variety of corrosion inhibitors exist for liquid hydrocarbon fuel compositions, a suitable inhibitor for fuel oil must meet several important and restrictive specifications. For example, only very small amounts of corrosion inhibitors can be tolerated in these fuels, since substantial amounts, e.g., more than about 0.1%, will prohibitively increase the cost of the fuel and may also produce undesirable secondary effects. A particularly frequent and deleterious side effect of corrosion inhibitors is that of inducing undesirable emulsification characteristics in the fuel. It is important to have a certain low emulsifying activity so that minor amounts of moisture present in the fuel will remain dispersed and will not deposit and therefore will not cause disturbances. On the other hand, however, an excessive emulsifying activity will lead to dissolution of water, resulting in failure of the fuel to meet specifications with regard to water content, and possible sludging.

It has been proposed to use as corrosion inhibitors for mineral oils N-acyl-amino acids having the formula

R—CO—N(R')CH$_2$—COOH where R is an alkyl or alkenyl group having 10–24 carbon atoms, and R' is hydrogen or C$_1$–C$_4$ alkyl. It is also known that the anti-corrosive action of these N-acyl-amino acids can be decidedly improved by using them in combination with high-molecular-weight amines; i.e., amines having at least 12 carbon atoms and therefore having strong lipophilic character. Amines containing a lipophilic group, derived from natural fatty acids such as oleic acid, stearic acid, etc., and from resin acids, such as abietic acid, are preferred. Natural fats, such as coconut oil, soybean oil, tall oil, etc. or natural resins are generally used as starting materials.

The salts of N-acyl-amino acids with several lipophilic amines have been proposed as corrosion inhibtors and some have come into practical use. In addition to simple monoamines, such as amines from coconut oil, N-alkyl-alkylene diamines have been proposed, alkyl having at least 8, and preferably 16–18 carbon atoms and alkylene being ethylene or propylene (see U.S. 2,935,389, issued May 3, 1960, to Titsworth et al.). Further, U.S. 3,116,252, issued Dec. 31, 1963, to Beretvas, describes monoamines with condensed chains consisting of ethylene and/or propylene oxide groups, such as ethoxylated abietyl amine. In U.S. 3,034,907, issued May 15, 1962, to Kleeman et al., hydroxyalkyl-substituted nitrogen bases having one or more lipophilic groups, preferably diamines such as N-hydroxyethylaminoethylstearyl amine or N-substituted derivatives thereof have been proposed. Finally, U.S. 2,919,979, issued Jan. 5, 1960, to Martin et al., and U.S. 3,116,252 mention the use of disubstituted imidazoles, such as 1-hydroxyethyl-2-alkyl imidazoline, where alkyl contains 8–20 carbon atoms and has a lipophilic function.

All of these nitrogen compounds, and their N-acyl-amino acid salts have the disadvantage of acting as strong emulsifying agents. In fact, several of them have been proposed for use, in correspondingly low concentrations, for preventing deposition of ice crystals in automobile carburetors (i.e., as antiicants). Because of this high emulsifying activity these compounds are not suitable for use as corrosion inhibitors, for example, fuel oils, since concentrations of about 0.02% by volume are required for an effective protection against corrosion and at these concentrations emulsifying activity is very high. Experience has shown that this undesirable effect cannot adequately be suppressed by the addition of surface-active agents known to act as demulsifiers.

It has now been discovered that N-acyl-amino acids of the formula R—CO—N(R')CH$_2$—COOH, where R is an alkyl group having 10–24 carbon atoms, and R' is hydrogen or C$_1$–C$_4$ alkyl provides excellent, lasting protection against corrosion without showing any emulsifying activity when used in combination with morpholine. The corrosion protection afforded by this combination is better than that of conventional combinations discussed above. This superior protection against corrosion is quite unexpected, since morpholine certainly is not a lipophilic substance and, as a monovalent base, is also distinctly different from the diamines and polyamines which have generally been considered advantageous in the art. The superior effect cannot be attributed to the fact that morpholine, as a strong base, renders the aqueous phase alkaline and thus prevents the formation of rust, since it has also been found that morpholine used in stoichiometric proportion is considerably more active than when used in excess of the acid additive. It is also surprising that the emulsifying activity known from the conventional combinations is not present, since morpholine alone is known to have strong emulsifying tendencies.

Particularly preferred acyl-amino acids are those in which R' in the above formula is methyl. Especially preferred acids are N-acyl sarcosines of the formula

R—CO—N(CH$_3$)CH$_2$COOH

where R is alkyl or alkylene having 14–18 carbon atoms. Examples of suitable compounds are N-lauroyl sarcosine, N-oleoyl sarcosine, N-myristoyl sarcosine, N-stearoyl sarcosine, and N-decanoyl sarcosine. Especially preferred is N-oleoyl sarcosine.

3

The corrosion inhibitors of the invention are effective in very low concentration, e.g., about 0.0005% w. total inhibitor concentration. It is preferred to use amounts of from about 0.001% to about 0.1% w. of total inhibitor. In general, the two components are desirably present in about stoichiometric proportions; and are generally useful in mol ratios of about 0.1 to 10 of acid to morpholine, preferably 0.2 to 5.

The invention will be illustrated with regard to the following example:

EXAMPLE

In each of the following tables a combination of oleoyl sarcosine and morpholine is compared with several known combinations. The numbers indicate the number of days that the test lasted before slight rust formation and marked rust formation occurred, respectively. The test procedure was as follows:

Discs cut from cold-rolled steel plate (mild steel), provided with a pressed recess 3 mm. deep and 10 mm. in diameter, were carefully cleaned and immersed in light fuel oil containing inhibitor. In each case, 0.1 ml. of 3% sodium chloride solution was placed in the recess, and the test pieces were left to stand at 20° C. The discs were periodically examined for rust formation; rusting was categorized in three degrees: (1) light rust deposit, (2) medium rust deposit, and (3) severe rust deposit. In each case several test pieces were compared. The test was discontinued as soon as a marked rust formation (2) was observed. The tables show the number of days required on appearance of stage (1) and stage (2) respectively. Total test duration was 70 days. In each case, the corrosion inhibitor consisted of 70% w. oleoyl sarcosine and 30% w. amine. Total inhibitor concentration was 0.01% w. in Table I and 0.005% w. in Table II.

TABLE I.—TOTAL INHIBITOR 0.01% WT.

| Amines used with N-oleoyl sarcosine | Number of days required for rust formation | |
|---|---|---|
| | Light rust (1) | Marked rust (2) |
| Fatty amine of coconut oil | 21 | 33 |
| N-trimethylene amine of soybean fatty oil | 46 | 52 |
| Ethoxylated tall oil fatty amine | 66 | |
| Oleic acid aminopropyl amide | 52 | 66 |
| Morpholine | Rust-free | |

TABLE II.—TOTAL INHIBITOR 0.005% WT.

| Amine | Weight ratio oleoyl sarcosine/amine | Number of days required for rust formation | |
|---|---|---|---|
| | | Light rust (1) | Marked rust (2) |
| Fatty amine of coconut oil | 70/30 | 6 | 21 |
| N-trimethylene diamine of soybean fatty oil | 70/30 | 21 | 28 |
| Ethoxylated tall oil fatty amine | 70/30 | 40 | 46 |
| Morpholine | 70/30 | 66 | |
| Morpholine | 78/22 | Rust-free | |

I claim as my invention:

1. A hydrocarbon composition comprising a major amount of normally liquid hydrocarbon and minor corrosion-inhibiting amounts of (1) an N-acyl amino acid of the formula $$R-\overset{O}{\underset{\|}{C}}-N(R')CH_2-COOH$$

where R is alkyl or alkenyl having 10 to 24 carbon atoms, and R' is hydrogen or $C_1$–$C_4$ alkyl, and (2) morpholine.

2. The composition of claim 1 wherein the normally liquid hydrocarbon boils in the fuel oil range.

3. The composition of claim 1 wherein the total amount of inhibitor is from 0.0005 to 0.1% by weight of the final composition, and the acid and amine are present in a mol ratio of from about 0.1 to about 10.

4. The composition of claim 1 wherein the N-acyl amino acid is N-oleoyl sarcosine.

References Cited

UNITED STATES PATENTS

| 1,903,287 | 4/1933 | Cox | 252—392 |
| 2,239,841 | 4/1941 | Cook | 252—392 |
| 2,919,979 | 1/1960 | Martin et al. | 44—71 |
| 2,935,389 | 5/1960 | Titsworth | 44—71 |
| 3,019,196 | 1/1962 | Andersen et al. | 44—63 |
| 3,034,907 | 5/1962 | Kleemann et al. | 44—66 |
| 3,156,687 | 11/1964 | Andersen et al. | 44—63 |

DANIEL E. WYMAN, Primary Examiner

Y. H. SMITH, Assistant Examiner

U.S. Cl. X.R.

44—66; 252—392